March 26, 1946.   L. B. NEIGHBOUR ET AL   2,397,429
WHEELED VEHICLE
Original Filed Nov. 4, 1940   3 Sheets-Sheet 1
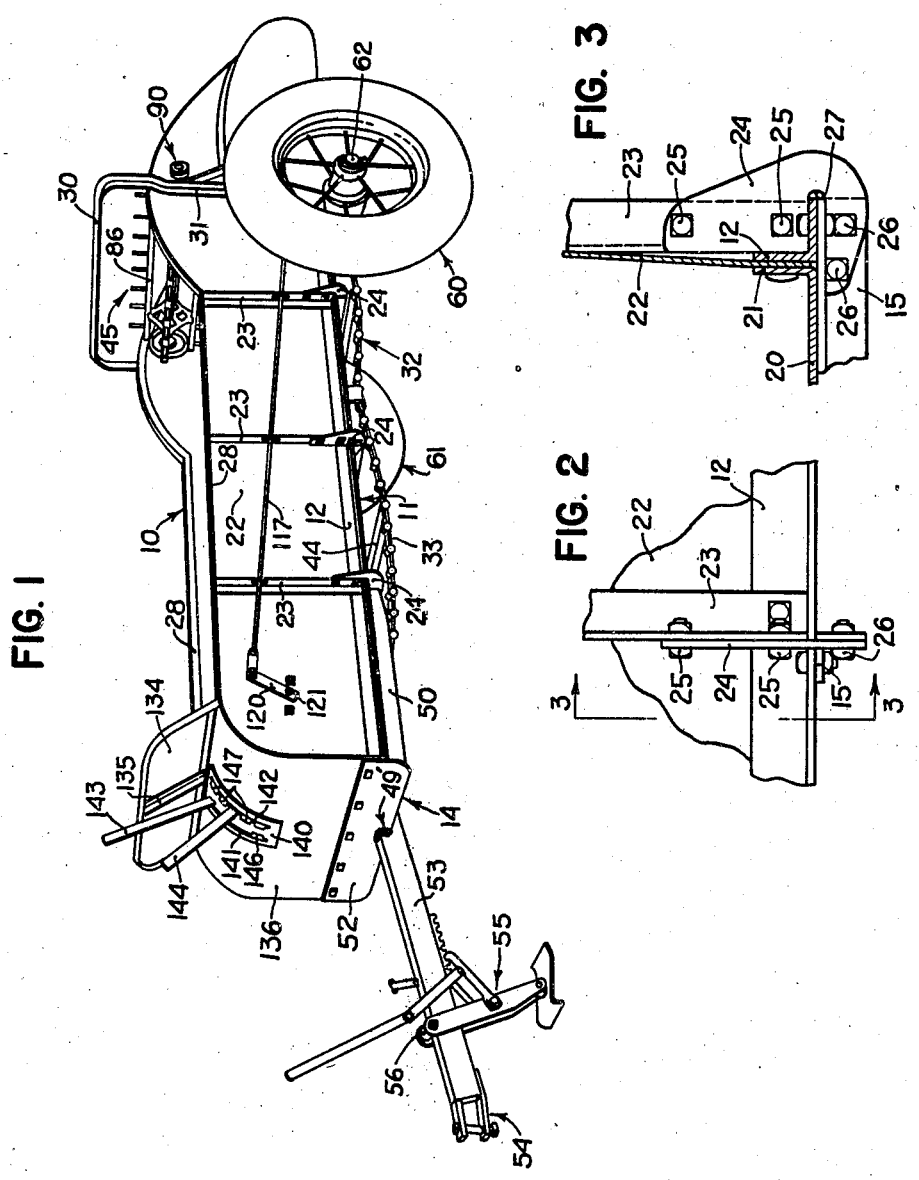
INVENTORS
Leonard B. Neighbour
and Frederick A. Thomann
BY
ATTORNEYS.

March 26, 1946.     L. B. NEIGHBOUR ET AL     2,397,429
WHEELED VEHICLE
Original Filed Nov. 4, 1940     3 Sheets-Sheet 2

INVENTORS
Leonard B. Neighbour
and Frederick A. Thomann
BY
ATTORNEYS.

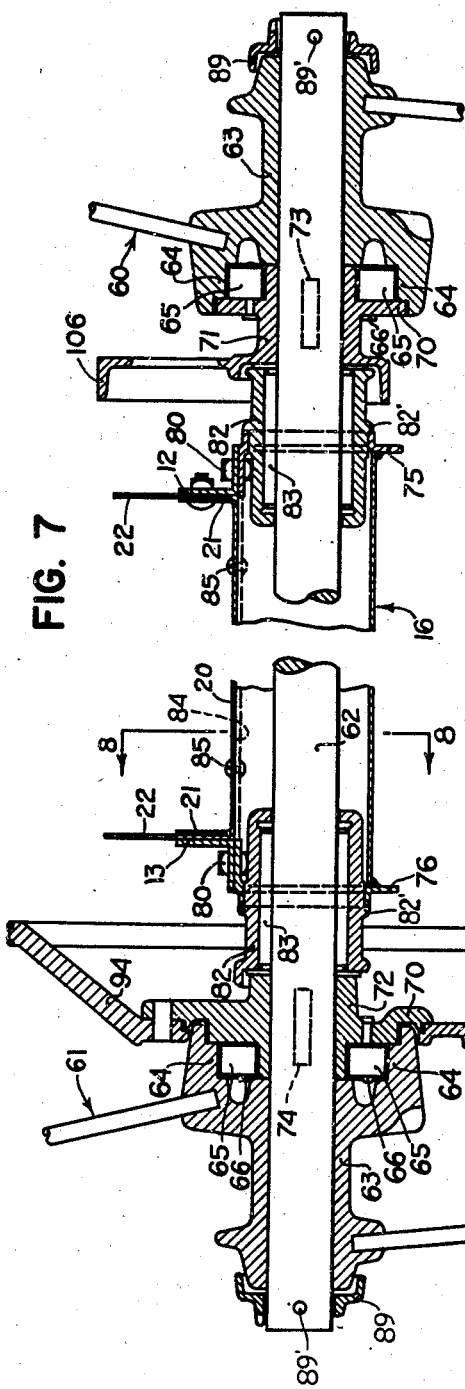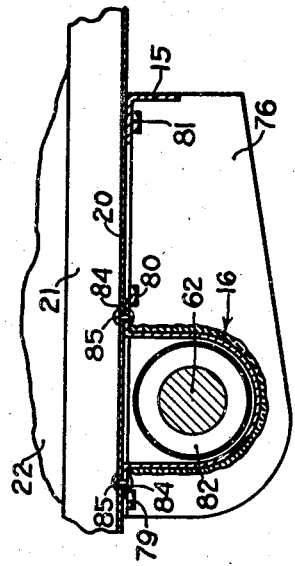

Patented Mar. 26, 1946

2,397,429

UNITED STATES PATENT OFFICE 2,397,429

WHEELED VEHICLE

Leonard B. Neighbour, Moline, and Frederick A. Thomann, East Moline, Ill., assignors to Deere & Company, Moline, Ill., a corporation of Illinois Original application November 4, 1940, Serial No. 364,196. Divided and this application June 15, 1942, Serial No. 447,098

5 Claims. (Cl. 296—28)

The present invention relates to two-wheeled tractor-drawn implements, and more particularly to a tractor-drawn manure spreader of the type comprising a body supported at the rear end on a pair of laterally spaced wheels and at the front end on the tractor drawbar. This application is a division of our co-pending application, Serial No. 364,196, filed November 4, 1940, and issued November 24, 1942 as Patent No. 2,302,879.

The principal object of this invention is to provide an improved two-wheeled manure spreader that is exceedingly stiff and rigid against lateral twisting or weaving when the spreader is unevenly loaded or when it is driven over rough ground, but which is light in weight and economical to manufacture. In the furtherance of this object, we have provided a transverse torque member fixed to the body adjacent the rear end thereof and a rigidly braced hitch frame fixed to the front end of the body, which cooperate to produce a vehicle structure of great strength and rigidity. Additional stiffness is provided by a transversely extending curved sheet, or hood, fixed to the front end of the body adjacent the hitch frame, which is also slotted and notched to serve as a locking sector for certain adjusting levers disposed beneath the hood.

A further object is to provide improved means for rigidly bracing the sides of the body against spreading when heavily loaded.

Another feature of our invention consists in mounting the axle bearings in the ends of the transverse torque member, with the live axle extending through the torque member whereby the axle is located at the point of maximum stiffness and is relieved of bending stresses.

These and other objects and advantages of the present invention will become apparent to those skilled in the art after consideration of the following detailed description of the preferred embodiment thereof, reference being had to the accompanying drawings, in which:

Figure 1 is a perspective view of a two-wheeled manure spreader constructed according to the principles of our invention;

Figure 2 is an enlarged detail view of one of the braces holding the sides of the manure box in place;

Figure 3 is a sectional view, taken along the line 3—3 in Figure 2;

Figure 7 is an enlarged transverse vertical section through the rear axle and torque member, taken substantially along the line 7—7 in Figure 4; and Figure 8 is a section taken along the line 8—8 in Figure 7.

Figure 4:
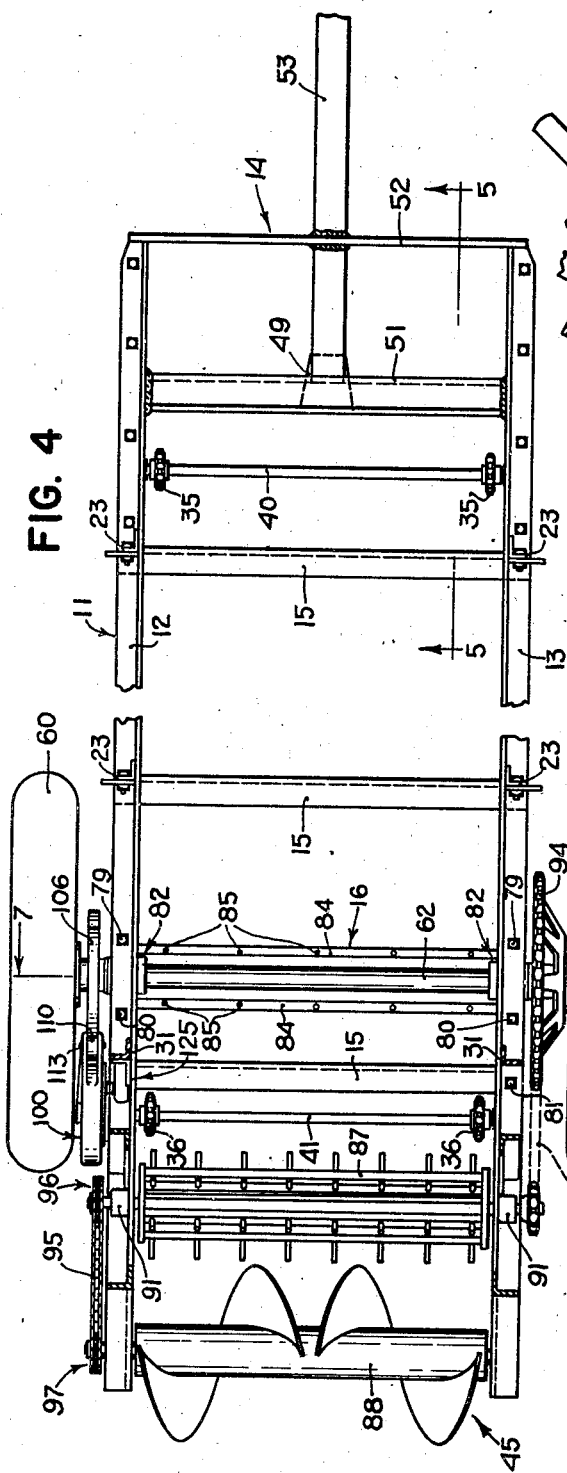
Figure 4 is a top plan view of the under frame structure supporting the manure box and spreading mechanism with the floor plate and apron removed.

Referring now to the drawings, the manure spreader illustrated consists of a generally fore and aft extending body 10 supported on a frame structure 11 comprising a pair of laterally spaced, longitudinally extending angle iron members 12 and 13 which are joined together at their front ends by a hitch frame 14. Transversely disposed cross angle members 15 connect the frame members 12, 13 at longitudinally spaced intervals, and near their rear ends the frame members are connected by a transverse torque member 16, which will hereinafter be more fully described. A sheet metal bed, or flooring 20 rests upon and is fixed to the cross members 15 and has upwardly turned flanges 21 at the sides thereof which are fixed to the longitudinal frame members 12, 13.

The side walls of the spreader body are indicated by the reference numeral 22 and are preferably made of sheet metal which is fixed to vertical angle members 23. The upper edge and curved front end of the side walls are reenforced by light angles 28, one flange of which is fixed to the inner sides of the side walls and the other flange of which extends outwardly over the edge of the side walls. The vertical members 23 are fixed at their lower ends to the longitudinal frame members 12, 13, adjacent the ends of the cross members 15, and are connected with their respective cross members by braces 24. The braces 24 consist of plates which are adapted to be bolted at 25 to the transverse vertical flanges of the vertical angle members 23, and at 26 to the transverse vertical flanges of the cross members 15. The edges of the plates are slotted at 27 to receive the horizontal flanges of the longitudinal frame members 12, 13 and 15. This construction provides a brace of great strength for preventing the sides of the body from spreading, and at the same time eliminates the need for projecting the ends of the transverse members laterally outwardly beyond the side walls to secure a connection for the brace.

The sides of the body are tied together at the top by an angle iron member 30 formed in the shape of an inverted U, the extremities 31 thereof projecting down along the exterior of the side walls and being secured thereto. The arch portion of the member 30 extends far enough above the side walls of the body to permit a heaped-up load of material carried by the body to pass thereunder.

The material carried in the body is caused to travel gradually rearwardly therein, when the machine is in operation, by an endless belt conveyor or apron 32 of the type comprising a pair of laterally spaced endless chains 33 which are trained over sprocket wheels 35 and 36 mounted on front and rear shafts 40 and 41, respectively. The shafts 40, 41 are journaled in suitable bearings (not shown) fixed to the under sides of the longitudinal frame members 12, 13. Transverse slats 44 of angle iron are fixed to the chains 33 at intervals, and scrape along the flooring 20 to carry the material rearwardly to rotary beating and distributing mechanism, indicated generally by the reference numeral 45, disposed at the rear of the spreader body. The conveyor is operated by mechanism that will be described in detail presently.

Figure 5:
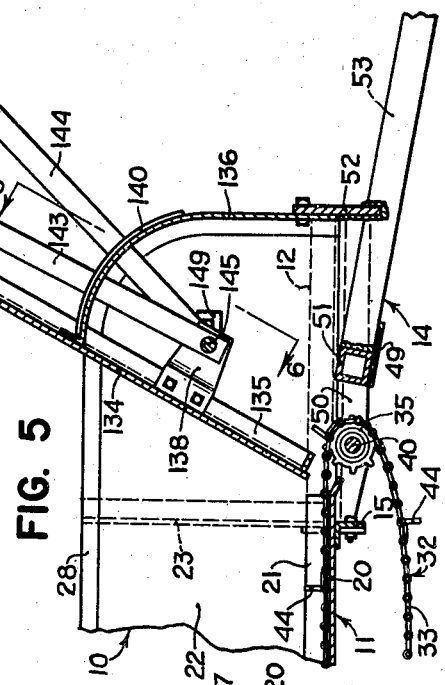
Figure 5 is a vertical section, taken through the manure box and frame substantially as indicated by the line 5—5 in Figure 4 but showing the floor plate and apron.
Figure 6:
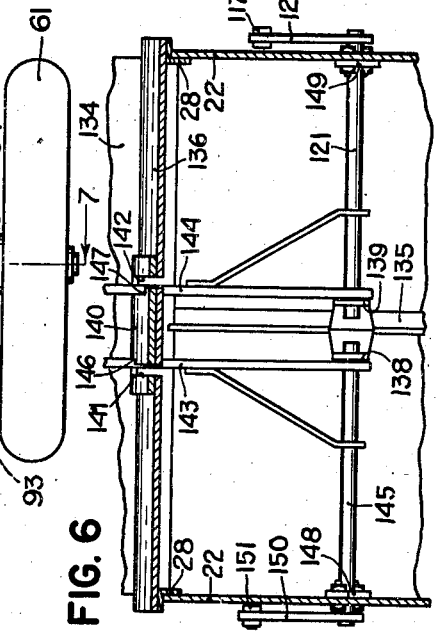
Figure 6 is a sectional view taken along the line 6—6 in Figure 5.

The front end of the body 10 is supported on the hitch frame 14 and is rigidly braced thereby against twisting about the longitudinal axis of the body. The hitch frame 14 consists of a pair of laterally spaced fore and aft extending angle members 50 which are fixedly secured to the under sides of the longitudinal frame members 12, 13 at the front ends thereof. The members 50 are connected together by a pair of fore and aft spaced, transversely extending beams 51 and 52 which are welded to the midpoints and front ends, respectively, of the members 50. Preferably, the beam 51 is a box section beam tilted forwardly slightly, as best shown in Figure 5, while beam 52 consists of a vertically disposed flat plate or bar. A box section draft tongue 53 is welded to the midpoint of beam 51 and is additionally secured thereto by a gusset plate 49. The tongue extends forwardly and downwardly from beam 51 through a notch 49′ in the bottom edge of beam 52, to which it is welded. The front end of the draft tongue 53 is provided with any suitable coupling means 54 adapted for connection with the drawbar of a tractor. When the draft tongue is hitched to a tractor drawbar, a considerable portion of the weight of the spreader body and the load carried thereby is supported on the drawbar. When the tongue 53 is disconnected from the tractor, it is supported on a swinging jack stand 55 which is pivoted to the tongue at 56. The hitch frame construction described above is exceedingly rigid and adds materially to the stiffness of the body for resisting twisting when one corner of the spreader is more heavily loaded than the others.

The rear end of the spreader is supported on a pair of laterally spaced traction drive wheels 60 and 61 which also furnish the power for driving the conveying and distributing mechanism. The wheels, 60, 61 are mounted upon a rear axle 62 which extends transversely across the rear portion of the body. Each of the drive wheels has a hub 63 (Figure 7) journaled on the axle 62 and formed with internal ratchet teeth 64 which are engaged during forward travel of the spreader by spring-pressed dogs 65 journaled on pins 66 fixed to flanges 70 of sleeves 71, 72. The sleeves 71, 72 are preferably secured to the axle by keys 73, 74. With the construction described, the axle 62 and the sleeves 71, 72 are driven in unison, both wheels furnishing driving power on straight-away travel, and, when a turn is being made, the power being furnished by the wheel traveling through the larger arc, the other wheel at such time being permitted to idle by reason of the ratchet mechanism above described.

The load-carrying body is supported from the rear axle by brackets 75 and 76 which are secured to the under sides of the longitudinal frame members 12, 13, respectively, by bolts 79, 80 and 81. Bearing housings 82 are carried in the brackets 75, 76, and the axle 62 turns on rollers 83 disposed within the bearing housings. The housings 82 are provided with shoulders 82′ which abut the brackets 75, 76, but permit the bearings 82 to align themselves in the brackets. The wheel hubs 63, sleeves 71, 72, and bearings 82 are secured on the shaft 62 in abutment with the brackets 75, 76, respectively, by caps 89, which are fixed to the ends of the shafts 62 by pins 89′.

The transversely disposed torque member 16 embraces the rear axle 62 and is made of heavy gauge sheet metal or boiler plate, preferably bent into the form of a U-shaped channel member having outwardly turned flanges 84 which are riveted at 85 to the under side of the flooring 20. The laterally outer ends of the torque member 16 are welded to the inner surfaces of the bearing support flanges 75, 76, thereby forming, in effect, a closed, hollow beam wherein the flooring 20 constitutes one side of the beam. The above-described beam construction has great torsional strength and adds to the stiffness and rigidity of the spreader body.

The beating and distribution mechanism 45 consists of an upper beater 86, a lower beater 87, and a rotary widespread 88 to the rear thereof, the function of the beaters being to break up the manure as it is fed thereto by the conveyor 32, and to distribute the manure to the widespread which scatters it over the ground. The beaters 86 and 87 are mounted on suitable shafts which are journaled in bearings 90 and 91 fixed to the sides 22 of the body. The beaters are driven through the medium of a chain 93 having driving engagement with a large sprocket 94 fixed to the flange 70 of the sleeve 72, and the chain 93 is trained over sprockets fixed to the ends of the beater shafts.

The rotary widespread 88 is driven from the lower beater 87 by a chain 95 which is trained around sprockets 96 and 97 fixed to the left hand ends of the beater and drum shafts, respectively. Suitable means, not shown, is provided for interrupting the drive from the sprocket 94 to the sprocket 92, thereby stopping the operation of the beating and distributing mechanism.

The conveyor 32 is propelled through the sprocket wheels 36 on the rear shaft 41, the latter being driven slowly by ratchet mechanism contained within a housing 100, which is journaled on the extended end of the shaft 41 outside of the body. The ratchet mechanism is shown and described in the above mentioned co-pending application, to which reference may be made for such details. It is sufficient for present purposes to state that the ratchet mechanism advances the shaft 41 when the housing 100 is rocked about the axis of the shaft. This is accomplished by means of a camming member 106, formed integrally with the flange 70 of the sleeve 71 and which rotates therewith as the spreader travels forwardly, engaging a roller 110 journaled on a pin 113, carried on the housing 100. The rate of speed of the conveyor is controlled by controlling the extent of rocking movement of the housing 100, as described in said co-pending application. This is accomplished by means of a hand operated lever 144, mounted on a transverse shaft 121, which is connected with the housing 100 through a lever arm 120 and link rod 117.

Fixed to the side walls 22 of the load carrying body 10 adjacent the front end thereof is a downwardly and rearwardly inclined dash 134, the lower end of which terminates substantially at the front end of the flooring 20 (Figure 5) but spaced above the latter to provide a transverse slot extending substantially between said side walls, through which the conveyor chain 33 and slats 44 can pass. The dash extends above the top of the side walls to allow the manure to be heaped up and thereby increase the quantity of manure carried in each load. A reenforcing angle member 135 is fixed to the under side of the dash and extends down the center thereof. A generally transversely disposed hood 136 of heavy gauge sheet metal or boiler plate is fixed to the front ends of the side walls 22 upon the laterally extending flanges of the reenforcing angles 28 and is bolted to the top edge of the hitch frame cross bar 52. The hood 136 extends upwardly from the bar 52, curving rearwardly near its upper end to correspond to the curvature of the sides, and is joined to the underside of the inclined dash 134. A curved reenforcing plate 140 is fixed to the longitudinal center portion of the curved hood, and both the hood and plate have a pair of laterally spaced vertical slots 141 and 142 formed therein to pass levers 143 and 144, respectively, which are mounted on transversely extending shafts 145 and 121. The shafts 145 and 121 are disposed within the space enclosed by the inclined dash 134, hitch frame 14, and curved hood 136, and are journaled in brackets 138 and 139 fixed to the member 135, and in bearing members 148 and 149 fixed to the side walls 22 of the body. One side of slot 141 is notched at 146 to receive and lock the lever 143 in adjusted position, while slot 142 is notched at 147 to receive and lock the lever 144 in adjusted position. Preferably, the curve of the hood 136 and plate 140 is an arc about the axis of the shafts 121, 145, so that the notches of the slots 141 and 142 engage their respective levers 143, 144 at the same point in any position of adjustment. As stated previously, lever 144 controls the rate of feed of the mechanism actuating the conveyor apron 32. Shaft 145 likewise has an arm 150 mounted on the outer end thereof which is connected with an operating rod 151 having operating connection at its rear end with the mechanism (not shown) for interrupting the transmission of power from the axle 62 to the beaters 86, 87 and widespread 88.

A manure spreader constructed in the manner described above is light in weight and economical to manufacture, and at the same time has great strength and rigidity for resisting torsional forces tending to twist the body about its longitudinal axis. This rigidity results from the combination of the several structural elements, such as the hitch frame 14, curved hood 136, and torque member 16, which go to make up the complete machine.

What we claim as our invention is:

1. A vehicle body structure comprising a pair of laterally spaced, fore-and-aft extending beams, a plurality of cross members fixed to said beams, sheet metal flooring fixed to said beams and supported on said cross members, a pair of apertured brackets fixed to said beams at opposite sides of the body and depending therefrom, a pair of coaxial bearings carried on said brackets, respectively, and extending through apertures in the latter, a transverse wheel-supported axle journaled in said bearings, and a channel-shaped sheet metal stiffening member fixed to the under side of said flooring to form with the latter a hollow beam embracing said axle and bearings and extending between said pair of brackets, said stiffening member being rigidly fixed at opposite ends to said bearing brackets, respectively.

2. In a vehicle body structure, a rigid floor, a pair of laterally spaced depending plates fixed thereto and having coaxial openings therein, a pair of bearing sleeves disposed within said openings and supported by said plates, an axle journaled in said bearings, and a channel shaped sheet metal stiffening member fixed to said floor to form with the latter a hollow beam embracing said axle and bearings and extending between said plates, the ends of said stiffening member being fixed to said plates, respectively, around said bearing receiving openings.

3. A vehicle body structure comprising a pair of laterally spaced, fore-and-aft extending beams, a plurality of cross members fixed to said beams, sheet metal flooring fixed to said beams and supported on said cross members, a pair of laterally spaced depending plates fixed thereto and having coaxial openings therein, a pair of bearing sleeves disposed within said openings and supported by said plates, an axle journaled in said bearings, and a channel shaped sheet metal stiffening member fixed to said floor to form with the latter a hollow beam embracing said axle and bearings and extending between said plates, the ends of said stiffening member being welded along their edges to said plates, respectively, around said bearing receiving openings.

4. A vehicle body structure comprising a pair of laterally spaced, fore and aft extending beams, sheet metal flooring fixed to said beams, a pair of bearing brackets fixed to said beams at opposite sides of the body, a pair of coaxial bearings carried on said brackets, respectively, a transverse wheel-supported axle journaled in said bearings, and a channel-shaped sheet metal stiffening member fixed to said sheet metal flooring to form with the latter a hollow beam embracing said axle and bearings and extending between said pair of brackets, said stiffening member being rigidly fixed at opposite ends to said bearing brackets, respectively.

5. A vehicle body structure comprising a pair of laterally spaced, fore and aft extending beams, sheet metal flooring fixed to said beams, a pair of laterally spaced plates fixed to said beams at opposite sides of the body and depending therefrom, a pair of coaxial bearings mounted on said plates, respectively, a transverse wheel-supported axle journaled in said bearings, and a channel-shaped sheet metal stiffening member fixed to said sheet metal flooring to form with the latter a hollow beam embracing said axle and extending between said plates, the ends of said stiffening member being welded along their edges to said plates, respectively.

LEONARD B. NEIGHBOUR.
FREDERICK A. THOMANN.